C. G. BUCHANAN.
CRUSHER ROLL.
APPLICATION FILED AUG. 14, 1919.

1,390,019.

Patented Sept. 6, 1921.
2 SHEETS—SHEET 1.

Inventor
Charles G. Buchanan
By his Attorneys
Edwards, Sager & Richmond

UNITED STATES PATENT OFFICE.

CHARLES G. BUCHANAN, OF NEWARK, NEW JERSEY.

CRUSHER-ROLL.

1,390,019. Specification of Letters Patent. Patented Sept. 6, 1921.

Application filed August 14, 1919. Serial No. 317,455.

*To all whom it may concern:*

Be it known that I, CHARLES G. BUCHANAN, a citizen of the United States, residing at Newark, in the county of Essex and State of New Jersey, have invented certain new and useful Improvements in Crusher-Rolls, of which the following is a specification.

This invention relates to crusher rolls and particularly to the manner of forming detachable plates for the crushing surface of such rolls. The chief object of the invention is to provide such plates in segmental form adapted to be readily and accurately assembled on the roll and securely fastened in place against loosening or buckling in service.

In prior crusher rolls having segmental surface plates the segments have been directly bolted on by ordinary bolts passing radially through the plates and the roll rim. Such bolts come in the direct line of the shearing strain tending to work them loose and notwithstanding careful fitting between the parts it is extremely difficult to hold the plates in place by means of these bolts. The segmental plates which are usually made of manganese steel stretch or flow when subjected to wear under heavy pressure and either shear off the bolts or buckle and bend out of shape themselves if the bolts hold.

In the crusher roll made according to this invention these radial bolts are dispensed with and the crusher segments are mounted on a roll in such manner that the shearing and loosening stresses are taken up by abutting surfaces of the segment and the rim parts. The mating parts are also so formed and fitted that the wear on the surface will not warp or bend the segments which always remain snugly pressed against the rim surface at all points.

Other objects and advantages of the invention particularly in connection with segmental surface plates of manganese steel on crusher rolls of large diameter will appear from the following description taken in connection with the accompanying drawings in which—

Figure 1:
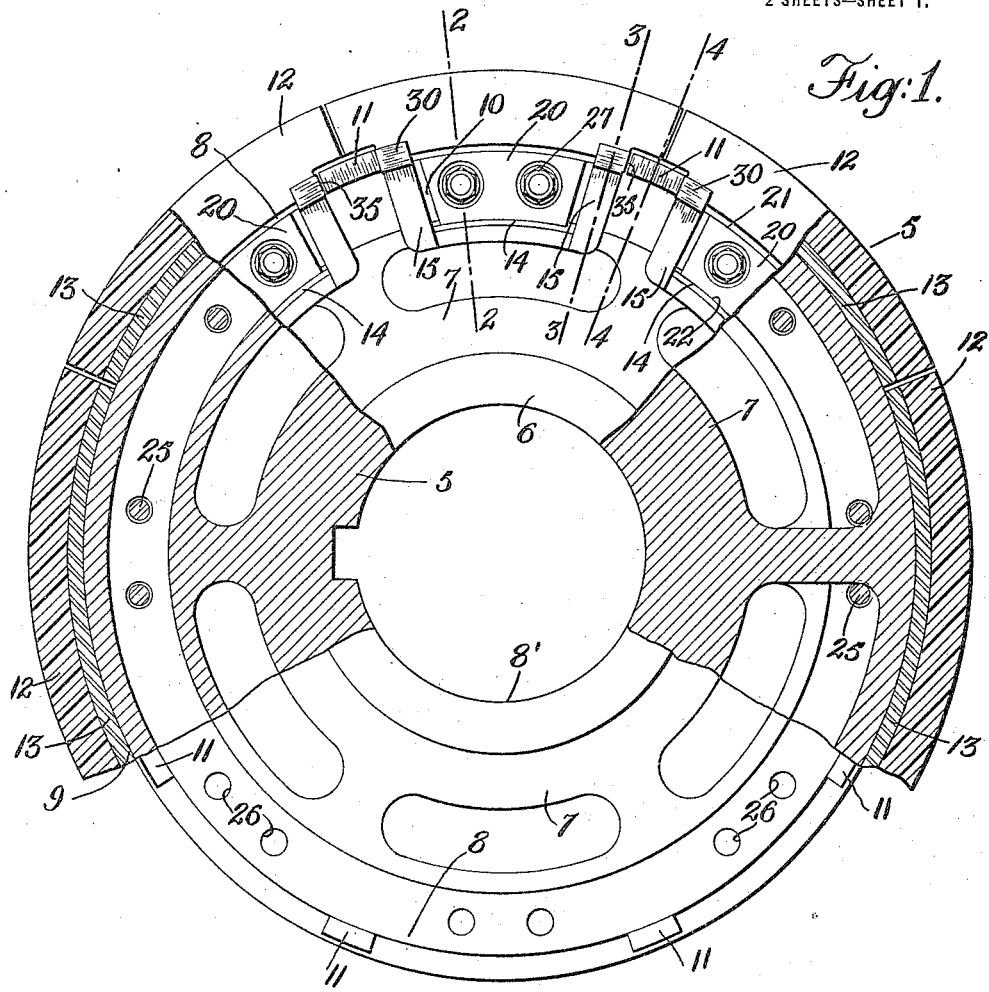
Figure 2:
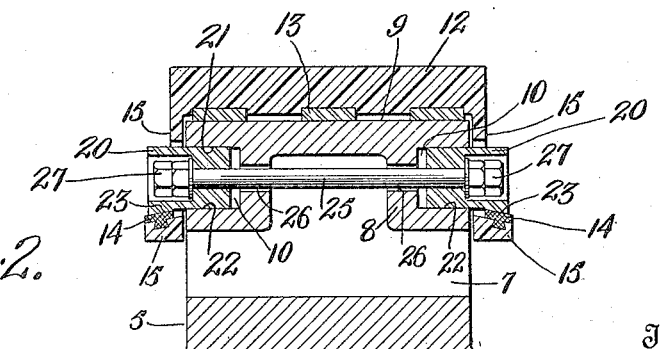
Figure 3:
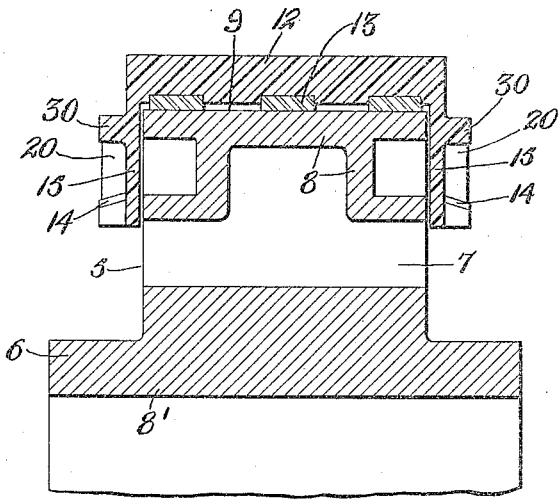
Figure 4:
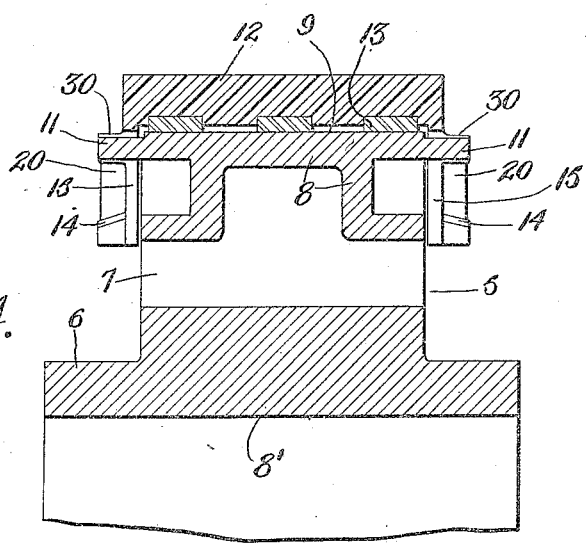

Figure 1 is a side view of a roll illustrating one embodiment of this invention with parts broken away and in section, and Figs. 2, 3 and 4 are sectional views of the roll taken on lines 2—2, 3—3 and 4—4 respectively of Fig. 1.

In the accompanying drawings illustrating one embodiment of the invention the wheel 5 forming the body of the roll has a hub 6 adapted to be keyed to a shaft not shown, a spoke portion 7 and a rim 8. The wheel 5 is of cast iron and after casting has its shaft hole 8′ bored and its rim surface 9 and the rim grooves 10 on each side turned to be accurately concentric with the bore 8′. Cast with the wheel are the projecting abutments 11, on each side of the rim extending outward horizontally within the outer periphery of the rim surface 9.

On the rim surface 9 are secured the crusher segments 12 of the roll making a complete circular crushing surface which may be corrugated or otherwise suitably formed. Each crusher segment 12 is preferably of manganese steel cast in a single piece with strips 13 of open hearth steel cast in place in their inner surfaces and facings 14 of Babbitt metal cast in place within the side yokes 15. After casting, a number of these segments are assembled into a complete ring and blocked up in position and then the surfaces of the strips 13 and facings 14 are accurately machined on circles of proper diameter. The inner diameter of the strips 13 will be the outer diameter of the rim; the diameter and slope of the facings 14 will correspond to the diameter and slope of the mating surfaces 23 of wedges 20 in grooves 10 of the rim. The wedges 20 are of open hearth steel and these wedges are also fitted by being blocked up into the form of a complete circle then their outer surfaces 21 are machined on a circle of a diameter corresponding to the larger diameter of grooves 10 and their inner surfaces 22 are machined on a diameter corresponding to the smaller diameter of grooves 10, while the wedge inclines 23 are formed on true conical surfaces around the same axis, the inclination from the axis being about 16%.

After being so formed and prefitted the parts are assembled into the roll as illustrated in Fig. 1. The segments 12 are positioned on the rim with their strips 13 in contact with the rim surface and their side yokes 15 between abutments 11 of the rim. The wedges 20 are then inserted through the yokes 15 and slide snugly between the inner and outer diameters of the grooves 10 to bring the inclined surfaces 23 into tight engagement with the correspondingly inclined surfaces of the Babbitt metal inserts 14. The wedges may be held in grooves 10 by any suitable means as by the rods 25 between opposite wedges, holes 26 being provided for these rods and adjusting nuts 27 to draw the wedges tightly into place.

In assembly or in use each segment will move along the rim slightly until the rear shoulders 30 of its yokes 15 bear against and are pushed by the abutments 11 at each side of the rim, clearance being provided as at 35 between the front shoulders 30 and the abutments 11. In service the radial stresses on the segments are transmitted by strips 13 to the rim surface 9, the side thrust by the inner surfaces of the yokes 15 against the edges of the rim while the peripheral thrust around the rim is transmitted by yoke shoulders 30 to the rim abutments 11. The tightening of the adjusting nuts tends to slide wedges 14 and 23 on each other and to bind the wedge pieces 20 in the grooves 10 so that any tendency of the wedges 14 to move outward will be resisted by these wedge pieces 20 which are practically integral with the rim.

All direct working stresses are thus met by surfaces of the rim and segment in abutment and the fastening and adjusting means, such as the tie rods 25, serve merely to keep the parts in place without having to sustain any of the direct working forces. The surface of the segments 12, made of manganese steel, may stretch and flow in service without imposing any stresses on the fastening means or loosening or disarranging the parts. All of the surfaces to be machined are of relatively soft metal and all of the fittings may be accurately predetermined by forming them into truly circular surfaces i. e. all of the fitted parts are circularly symmetrical around the axis of the roll shaft. At the same time each segment is easily attached and removed and is secured or released by simple tightening or loosening of the fastening means. All of the fitted parts are out of the way and protected against injury, only the surface of the segments being exposed to the crushing action.

While this invention has been explained in connection with a specifically described embodiment in which the segments 12 are of maganese steel these segments may be of chilled iron, chrome steel, high carbon open hearth steel, or similar metal. The projections 11 instead of being cast integral with the rim may be provided by the projecting ends of steel bars set in grooves across the rim so that if worn or broken they may be readily replaced and the principle of the invention is not confined to the roll shown but is intended to cover such modifications thereof as fall within the scope of the appended claims.

I claim:

1. In a crusher roll comprising a central rotatable member and a series of segmental facing plates, means for holding said plates in place on said member comprising projecting shoulders on the ends of said plates, abutments on said member engaged by said shoulders, and fastening means drawing radially inward on said plate projections.

2. In a crusher roll comprising a central rotatable member, a series of segmental facing plates, means for holding said plates in position on said member comprising radial projections on said plates fitting the ends of said member, abutments on said member engaging the edges of said projections, and fastening means drawing radially inward on said projections.

3. In a crusher roll comprising a central rotatable member, a series of segmental facing plates of means for holding said plates in position on said member comprising radial projections on said plates fitting the ends of said member, abutments on said member engaging the edges of said projections, and fastening means drawing radially inward on said projections.

4. A crusher roll comprising a central rotatable member having circular surfaces and axially extending abutments, a series of segmental parts having circular surfaces fitted to shift circularly on the circular surfaces of said central member to engage said abutments, and means for holding said segmental parts in place on said member.

5. In a crusher roll the combination with a central rotatable member having a periphery provided with abutments, of a series of segmental facing plates held against movement by said abutments and fitted to expand on said periphery, and retaining means for said plates drawing said plates against said periphery and permitting them to expand thereon.

6. In a crusher roll the combination with a central rotatable member having a continuous peripheral surface, of a series of segmental facing plates having inserts fitted to shift on said surface, and means for holding said plates in place on said member.

7. In a crusher roll the combination with a central rotatable member, of a series of segmental facing plates expansively fitted on the periphery thereof, means for fastening said plates in place including portions of said plates extending radially inward at each side of each of said plates, and means drawing radially inward on said extending portions.

8. In a crusher roll the combination with a central rotatable member, of a series of segmental facing plates on the periphery thereof, and means for fastening said plates in place comprising portions of said plates extending radially inward at each side of each of said plates and radially movable clamping means engaging said portions.

9. In a crusher roll the combination with a central rotatable member having a circular peripheral surface, of segmental facing plates slidably fitting said surface, abutments engaging said plates to hold them from shifting along said surface, and retaining means for said plates permitting them to expand away from said abutments.

10. In a crusher roll the combination with a central rotatable member having a circular peripheral surface, of segmental facing plates slidably fitting said surface and leaving a space between said plates so that said plates may expand along said surface, and retaining means holding said plates on said member.

11. In a crusher roll the combination with a central rotatable member having a continuous peripheral surface, of a series of segmental facing plates fitted thereto and means for holding said plates in place on said member comprising recesses in the sides of said member, wedges fitting in said recesses and engaging portions of said plates, and tightening bolts engaging said wedges and passing through said member.

CHARLES G. BUCHANAN.